Figure 1:
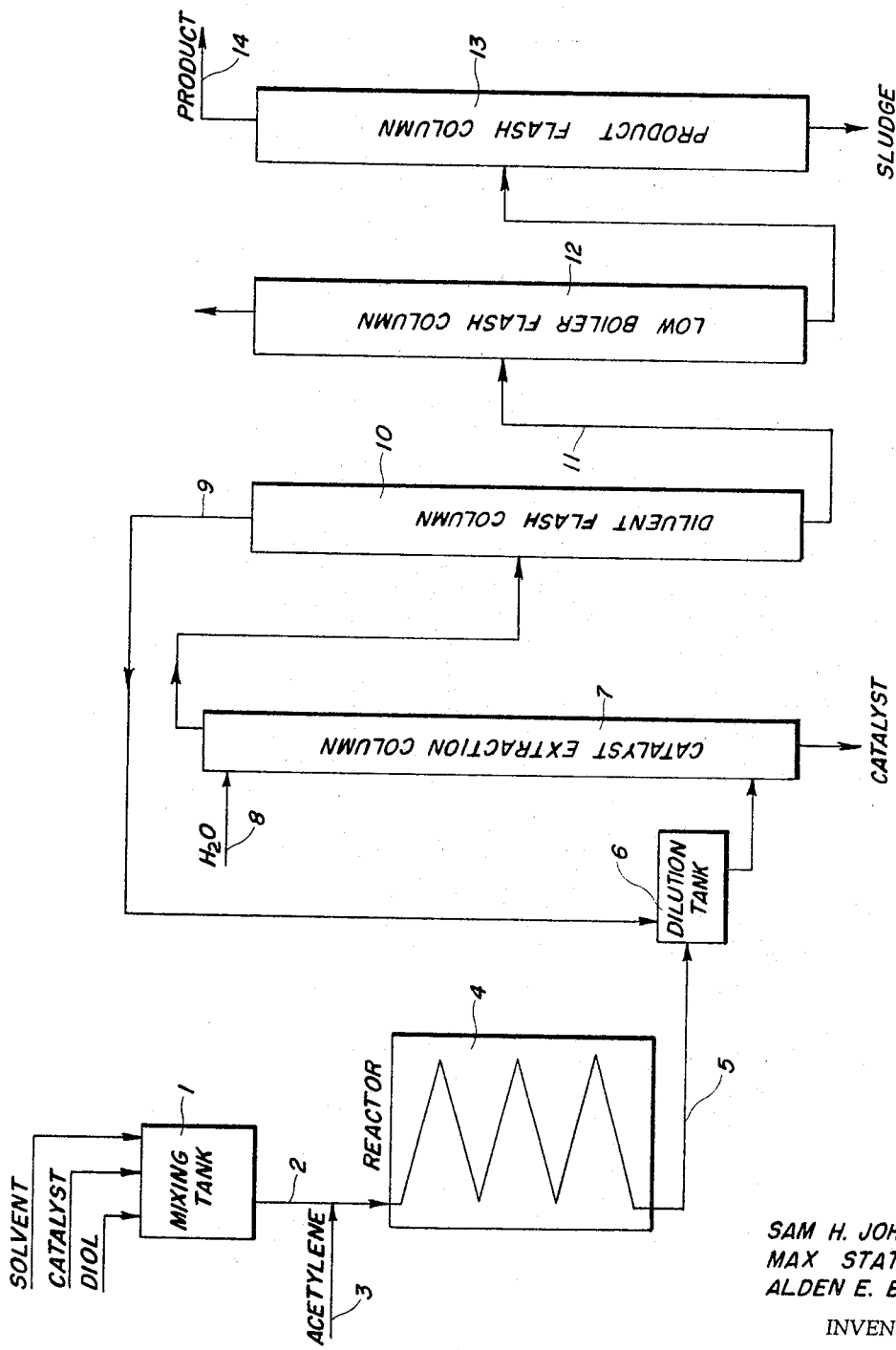

Nov. 22, 1966

S. H. JOHNSON, JR., ETAL 3,287,420

GLYCOL MONOVINYL ETHER

Filed April 26, 1963

2 Sheets-Sheet 1

SAM H. JOHNSON JR.
MAX STATMAN
ALDEN E. BLOOD
INVENTORS

BY R. Frank Smith
William T. French
ATTORNEYS

SAM H. JOHNSON JR
MAX STATMAN
ALDEN E. BLOOD
INVENTORS

BY R. Frank Smith
William T. French
ATTORNEYS 3,287,420
GLYCOL MONOVINYL ETHER
Sam H. Johnson, Jr., Max Statman, and Alden E. Blood, Longview, Tex., assignors to Eastman Kodak Company, Rochester, N.Y., a corporation of New Jersey
Filed Apr. 26, 1963, Ser. No. 275,918
1 Claim. (Cl. 260—615)

This invention relates to a novel organic compound and more particularly to 2,2,4-trimethyl-2-hydroxypentyl vinyl ether and to its method of preparation.

The compound of the invention, 2,2,4-trimethyl-3-hydroxypentyl vinyl ether,

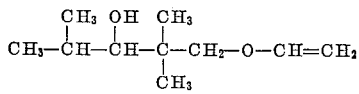

is a novel glycol monovinyl ether which has unexpectedly valuable properties. Some of these valuable properties reside in process advantages in preparing the compound, such as good conversions of the starting material to the desired monovinyl ether with little contamination from by-products. Other valuable properties reside in the utility of the compound as a monomer for copolymerization with other vinyl monomers, e.g., vinyl chloride, styrene-butadiene, methyl methacrylate, methyl acrylate, acrylonitrile, etc. With such monomers it forms copolymers having superior physical and chemical properties, e.g., as thermosetting acrylic lacquers, urethane foams, finishes for wood, paper, fibers or metals, and as plastics which can be used as sheets, films, fibers or molded articles.

Encyclopedia of Chemical Technology, vol. II, 649–651, reports that vinyl ethers copolymerize only very slowly and in small amounts with monomers such as vinyl chloride, ecrylonitrile, vinyl acetate, styrene, etc. when using a free radical catalyst. The products usually are of low molecular weight. For instance, styrene will not give copolymers with ethylene glycol monovinyl ether using a benzoyl peroxide catalyst (C.A., 50, 1674 h). In contrast, the compound of the invention has been copolymerized with styrene in substantial amounts, e.g., up to 10 percent, using benzoyl peroxide. It has also been reported that to prepare vinyl alkyl ether copolymers of acrylate and methacrylate esters, the more reactive acrylate or methacrylate must be fed slowly during the polymerization. These are the most reactive monomers for copolymerization with alkyl vinyl ether. In contrast, using a benzoyl peroxide catalyst, up to 30 percent by weight of the monovinyl ether of 2,2,4-trimethylpentane-1,3-diol has been incorporated into a methyl methacrylate copolymer and into a methacrylate copolymer without requiring the slow addition of the acrylic monomer.

Monovinyl ethers of glycols have been recognized as being desirable as monomers for copolymerization because they possess a functional group in addition to the vinyl radical, namely, the hydroxyl radical which offers opportunity for cross-linking and other desirable properties. However, a drawback has been that, normally, glycols do not produce monovinyl ether in reasonable yields under economically desirable conditions. The chief products expected in vinylating glycols are divinyl ethers and cyclic acetals. Unexepectedly, however, 2,2,4-trimethylpentane-1,3-diol reacts with acetylene under our novel combination of conditions to produce the monovinyl ether in good conversions and yields. Not only does our new process make it possible to produce a glycol monovinyl ether satisfactorily but the resulting product has unexpectedly valuable properties. It is surprisingly stable chemically. It can be processed, distilled, etc., at elevated temperatures, e.g., 150° C. or higher without forming cyclic acetals. In addition, as we will explain more fully hereinafter, various copolymers that it forms have unusually valuable properties.

In general, the method of the invention by which the novel compound is prepared comprises the reaction of acetylene with high purity 2,2,4-trimethylpentane-1,3-diol in the presence of a non-aqueous solvent and a basic vinylation catalyst at a temperature of 80 to 140° C. The reaction can be represented by the following equation:

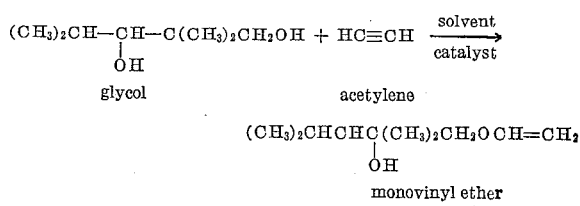

Important elements of the novel combination that characterizes our process include (a) the particular glycol employed, namely, 2,2,4,trimethylpentane-1.3-diol, (b) the use of a non-aqueous solvent, (c) the use of high purity glycol, (d) the use of a selected temperature range of 80 to 140° C. and preferably 110 to 120° C., (e) the use of a basic vinylation catalyst, preferably an alkali metal hydroxide and most preferably, potassium hydroxide, and (f) the use of a liquid phase reaction system, i.e., the glycol being in the liquid phase.

The solvent for our process is an inert non-aqueous solvent. Preferably the solvent is a vinyl ether or an alcohol of the formula $ROCH=CH_2$ or $ROH$. R is any hydrocarbon group free of aliphatic unsaturation and free of functional groups, especially alkaline-sensitive groups such as halogen, ketone, aldehyde and nitro groups, and can include alkyl, cycloalkyl and aryl groups having up to about 12 carbon atoms. The solvent should be miscible with both of the reactants and should not react with the catalyst. The preferred solvent is the product 2,2,4-trimethylpentane-1,3-diol monovinyl ether. Next in order of preference is a vinyl ether other than the product and third in order of preference is an alcohol. The alcohol normally will convert to the corresponding vinyl ether upon contact with the acetylene. Thus, strictly speaking, the alcohol itself is not inert but it forms an ether which is an inert solvent. Therefore, we means to include the use of an alcohol in the term "inert non-aqueous solvent."

We have found that the glycol should be of high purity, i.e., at least about 95 weight percent, in order to give the highest yield of the desired monovinyl hydroxy ether. Preferably, the purity of the glycol is at least 97 weight percent. Lower purity gives undesirable yields of cyclic acetals and other products even when the other conditions of our novel method are used.

The reaction temperature of 80 to 140° C. must be employed for satisfactory results. At temperatures below 80° C. the rate of reaction is too slow. At temperatures above 140° C. the yield of cyclic acetal is too high. Best results are obtained in the range of 110 to 120° C.

The catalysts for the process are alkaline vinylation catalysts. These include the oxides, alcoholates, phenolates, naphtholates, cyanides and hydroxides of alkali and alkaline earth metals. In general, catalysts of the type disclosed by Reppe et al., U.S. Patent No. 2,066,076 can be used. Potassium hydroxide is the preferred catalyst. It is the most soluble in the reaction mixture and produces the best results. We use solid potassium hydroxide but it need not be absolutely anhydrous. Sodium hydroxide is also good but less desirable than potassium hydroxide because of its lower solubility. The other alkali metal hydroxides are still less desirable because of their cost.

Other reaction conditions that can be varied over considerable ranges include the catalyst concentration, the solvent:glycol ratio and the reaction pressure. The preferred catalyst concentration is in the range of 5 to 15 weight percent based on the glycol although ranges of the order of 2 to 30 weight percent are suitable. The solvent: glycol ratio is not critical. Ratios in the range of 0.5 to 10:1 of solvent:glycol are generally suitable but the preferred range is 0.7 to 2:1 and the 1:1 ratio is usually employed. The reaction pressure is selected to give satisfactory reaction rate while avoiding the explosion hazard. Pressures of the order of 100 to 200 pounds per square inch gauge (abbreviated as p.s.i.g.) are preferred. Substantially higher pressures, e.g., 1000 p.s.i.g., can be used, but create an explosion hazard so we preferably use pressures within the standard safety limits for acetylene.

The method of the invention can be carried out either in a batch or continuous manner. The liquid 2,2,4-trimethylpentane-1,3-diol and a suitable acetylene solvent, e.g., the monovinyl ether of the diol in a 1:1 volume ratio, are mixed with the basic vinylation catalyst such as potassium hydroxide. The acetylene pressure, preferably of 100 to 200 p.s.i.g. is maintained and the reaction mixture is maintained at reaction temperature for a period sufficient to achieve the desired conversion, e.g., 6 to 36 hours. Shorter reaction times can be used at the higher pressures. The reacted material is recovered first by water extraction to remove catalyst and salts thereof, then by vacuum flashing to recover solvent and finally by vacuum distillation to produce purified monovinyl ether of the glycol. In a continuous system a portion of the monovinyl ether product can be recycled as solvent.

Figure 2:
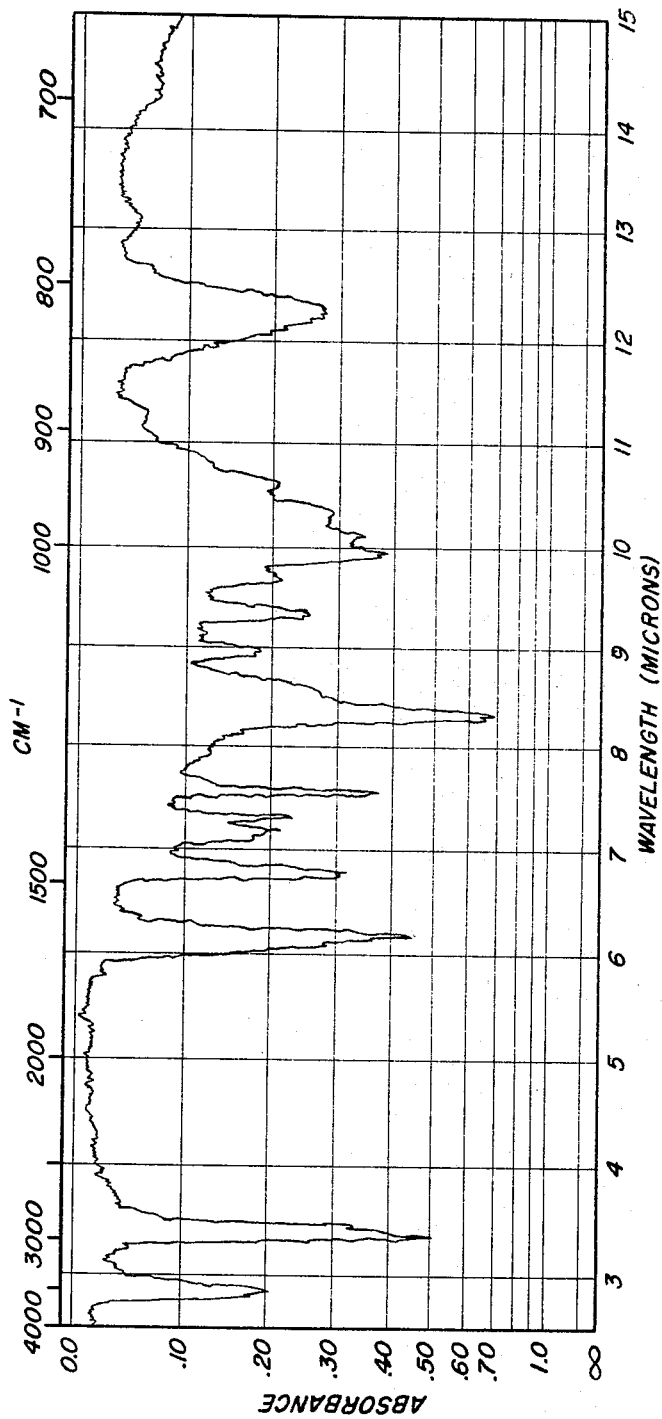

We will described our process in more detail by reference to the drawings, of which FIG. 1 is a schematic flow diagram of a continuous flow embodiment of the process and FIG. 2 is a plot of the infrared spectrum of the product of our process.

In the embodiment of FIG. 1 the solvent, e.g., 2,2,4-trimethylpentane-1,3-diol monovinyl ether, the catalyst, e.g., solid potassium hydroxide, and the 2,2,4-trimethylpentane-1,3-diol are fed to a mixing vessel 1. The mixture passes via line 2 with acetylene introduced via line 3 into the coil of reactor 4. In the reactor the mixture is heated, by means not shown, to the desired temperature, e.g., 120° C., and the acetylene is introduced at the desired reaction pressure, e.g., 160 p.s.i.g. Feed rates are selected such that the hold up time within reactor 4 is sufficient to achieve the desired degree of completion of the reaction. The crude reaction mixture passes via line 5 to a dilution tank 6 where it is preferably diluted with a liquid such as benzene. From the dilution tank 6 the mixture passes to the extraction distillation column 7 where it is distilled and countercurrently contacted with water introduced by line 8 to extract the catalyst and water soluble impurities. Leaving the extraction column 8 the crude monovinyl ether passes to the diluent flash column 10 from which the diluent is removed overhead via line 9 and returned to the dilution tank 6. From the base of the diluent flash column 10 the monovinyl ether is passed by line 11 to low-boiler flash column 12 where it is stripped of low boiling impurities and is flashed from the monovinyl ether flash column 13 as an overhead product 14.

FIGURE 1 illustrates continuous flow, but the process also can be carried out batch-wise by substituting a batch reactor for the mixing tank 1 and continuous reactor 4. The solvent, diol and catalyst are introduced into the batch reactor, which can be a heated autoclave with inlet and outlet lines. The reactor is purged with an inert gas to remove oxygen, then is heated to reaction temperature, e.g., 110 to 130° C., and is pressured with acetylene to reaction pressure, e.g., 100 to 200 p.s.i.g. The reaction mixture is analyzed at intervals for unreacted diol and when the concentration of the latter reaches a desired low level, the reaction is stopped. The reactor is then cooled and the reaction product is passed to the dilution tank and then is subjected to the same purification procedures as were described with reference to FIG. 1.

The product and method of the invention will be further illustrated by the following examples. In the examples and elsewhere in this specification "conversion" is used in its usual sense to mean the number of moles of monovinyl ether recovered as product divided by the stoichiometric number of moles of expected and "yield" is used in its usual sense to mean the number of moles of monovinyl ether recovered as product divided by the number of moles of diol consumed or lost in the reaction.

*Example 1*

Into a batch-type reaction vessel 570 grams of 2,2,4-trimethylpentane-1,3-diol, 60 grams potassium hydroxide and 425 grams vinyl isobutyl ether are placed. Air is flushed out and the reactor is heated to 120° C. and pressured to 160 p.s.i.g. with acetylene. After 24 hours the reactor is cooled and vented. The reactant materials recovered are washed with water and vacuum stripped at 100 mm. of Hg vacuum to recover 98 weight percent of the solvent used. The remaining material is distilled at 80° C. under 4 mm. of Hg vacuum to recover 512 grams of essentially pure monovinyl ether of 2,2,4-trimethylpentane-1,3-diol. The distillation residue contains 20 grams of the unreacted diol. This represents on a molar basis a 77% conversion and an 80% yield.

The product obtained by the procedure of Example 1 boiled at 285° C./760 mm., 177° C./100 mm. and 103° C./10 mm. Its index of refraction was 1.44887 (25°/D) and its specific gravity (20/20) was 0.9129. Combustion analysis for carbon and hydrogen showed C=69.74%, H=11.75% (theory 69.77% C. and 11.62% $H_2$). Molecular weight by boiling point depression was 180 (theory 172). The hydroxyl number was 318 (theory 323) while the bromine number by microhydrogenation was 87 (theory 93). FIGURE 2 is a plot of the infrared spectrum of the Example 1 product measured from a capillary smear sample of the liquid product.

Our analysis indicates that the product obtained by the procedure of Example 1 is essentially vinyl 2,2,4-trimethyl-3-hydroxypentyl ether. Apparently, the isometric 3-vinyloxy-2,2,4 - trimethylpentanol-1 is not produced. Thus, although the secondary hydroxyl group can be reactive, e.g., as a cross-linking group, in the monovinyl ether, it is very resistant to reaction during the vinylation of the diol.

*Example 2*

The preparation described in Example 1 was repeated except that the vinyl isobutyl ether was replaced with an equivalent amount of isobutanol as the solvent. The conversion and yield to monovinyl ether based on the glycol were 78% and 87%. The product monovinyl ether was identical to that produced in Example 1.

*Example 3*

The preparation described in Example 1 was repeated except that the vinyl isobutyl ether was replaced with an equivalent amount of 2-ethylhexyl vinyl ether as the solvent. The conversion and yield to monovinyl ether based on the glycol were 76% and 90%.

*Example 4*

The preparation described in Example 1 was repeated except that the vinyl isobutyl ether was replaced with an equivalent amount of the monovinyl ether of 2,2,4-trimethylpentane-1,3-diol as the solvent. The conversion and yield to monovinyl ether based on the glycol were 77% and 83%.

The following examples demonstrate the unique quality of 2,2,4-trimethyl-1,3-diol in vinylation reactions as compared with other diols having primary and secondary hydroxyl groups.

Example 5

The procedure described in Example 1 was followed in an attempt to prepare the monovinyl ether of 1,3-butanediol. The yield to monovinyl ether was only 20% while the yield to divinyl ether and cyclic acetal was 75%.

Example 6

The procedure described in Example 1 was followed in an attempt to prepare the monovinyl ether of 1,2-propanediol. The yield to monovinyl ether was only 10% while the yield to divinyl ether was 85%.

As we have indicated, a principal use of the product of our invention is the manufacture of copolymers by polymerization with other vinyl monomers. Examples of such copolymers are as follows:

*Copolymers with vinyl chloride.*—These copolymers are of value in coatings, urethane foams and plastisol sheeting. The combination of vinyl chloride and a reactive hydroxyl group leads to flameproof material, with good adhesion, flexibility and stability. The reactive function within the copolymer allows cross-linking reactions.

*Copolymers with styrene-butadiene.*—These copolymers are useful as binders, giving better printability, ink hold-out and flexibility. As latex paints they have improved flow characteristics, stability and vapor permeability.

*Copolymers with methyl methacrylate and with methyl acrylate.*—In the coating field application one obtains better adhesion, flexibility, and vapor permeability. In lacquers, a cross-linking system with ureaformaldehyde, diisocyanate, etc., is possible and leads to many novel properties.

*Copolymers with acrylonitrile.*—The presence of a reactive function gives an acrylic fiber with increased dyeability.

*Copolymers with vinylidene chloride-acrylate system.*—These copolymers are useful as coatings for paper and fiber owing to their excellent adhesiveness, stability and vapor permeability.

*Copolymers for internal plasticization.*—The reactive hydroxyl group within copolymers containing the monovinyl ether of 2,2,4-trimethylpentane-1,3-diol reacts with reagents such as phthalic anhydride to give a plastic with chemically contained plasticizers. Such plasticization does not migrate away from the plastic.

The following examples illustrate the preparation of particular copolymers with our novel hydroxy monovinyl ether.

*Example 7.—Copolymer of methyl methacrylate and the monovinyl ether of 2,2,4-trimethylpentane-1,3-diol.*

Into a stirred flask was added 650 grams toluene, 201 grams methyl methacrylate, 54 grams of the monovinyl ether of 2,2,4-trimethylpentane-1,3-diol and 1.5 grams of benzoyl peroxide. The reaction was run at 61° C. for 24 hours. The resultant polymer solution was essentially free of unreacted monomers. The presence of the still reactive hydroxyl group was demonstrated by reaction was phthalic anhydride and by infrared inspection. The ratio of adsorbance at $2.85\mu$ to adsorbance at $2.30\mu$ was 6.7 as compared to only 0.5 for poly(methyl methacrylate) when prepared by the same reaction. The inherent viscosity of the copolymer was 0.323 at 25° C. (0.5 g. per 100 ml. of toluene) as compared to 0.358 for poly(methyl methacrylate).

*Example 8.—Copolymer of vinyl chloride and the monovinyl ether of 2,2,4-trimethylpentane-1,3-diol.*

Into a batch reaction vessel was added 1600 grams water, 370 grams vinyl chloride, 20 grams monovinyl ether of 2,2,4-trimethylpentane-1,3-diol, 16 grams Duponol Me[1], 2.7 grams sodium persulfate, 3.2 grams sodium bisulfite, 2 ml. trimethyl amine (water solution containing 25% amine), and 2.4 ml. dodecyl mercaptan. The reaction was run for 24 hours at 50° C. Complete utilization of both monomers was noted and the copolymer was recovered from the emulsion. This copolymer showed an inherent viscosity of 0.52 when measured at 22.5° C. (0.5 g. per 100 ml. of dimethylformamide). Polyvinyl chloride when made by the identical procedure shows an inherent viscosity of 0.28. Solutions of 30% of the copolymer in tetrahydrofuran can be poured and cast into clear films while solutions containing 15% polyvinyl chloride cannot even flow from a bottle.

Further utility and advantages of our novel product are disclosed in United States patent application Serial No. 276,101, now abandoned, of H. J. Hagemeyer, Jr., et al. entitled "Copolymers Containing Vinylidene Chloride and 2,2,4-trimethyl-3-hydroxypentyl Vinyl Ether" filed concurrently herewith.

The invention has been described in considerable detail with particular reference to certain preferred embodiments thereof, but it will be understood that variations and modifications can be effected within the spirit and scope of the invention as described hereinabove, and as defined in the appended claim.

We claim:

2,2,4-trimethyl-3-hydroxypentyl vinyl ether.

---
[1] Duponol Me is an emulsifying agent. It is reported to be a fatty alcohol sulfate and is a product of E. I. du Pont de Nemours & Co.

References Cited by the Examiner

UNITED STATES PATENTS

| | | |
|---|---|---|
| 1,959,927 | 5/1934 | Reppe. |
| 2,615,050 | 10/1952 | Insinger _____ 260—615 X |
| 2,969,395 | 1/1961 | Nedwick et al. _____ 260—615 X |

LEON ZITVER, *Primary Examiner.*

H. T. MARS, *Assistant Examiner.*